United States Patent Office 3,598,844
Patented Aug. 10, 1971

3,598,844
AZIDOCINNAMIC ALDEHYDES
Hans Ruckert, Wiesbaden, and Walter Lüders, Neu-Isenburg, Germany, assignors to Kalle Aktiengesellschaft, Wiesbaden-Biebrich, Germany
No Drawing. Continuation-in-part of application Ser. No. 741,296, July 1, 1968. This application Jan. 29, 1970, Ser. No. 6,944
Claims priority, application Germany, July 6, 1967, P 16 43 322.0
Int. Cl. C07c 117/00
U.S. Cl. 260—349                          1 Claim

ABSTRACT OF THE DISCLOSURE

Azidocinnamic aldehydes, which may be nucleo- or side-chain-substituted are prepared either by reacting azidobenzaldehydes with vinyl alkyl ethers or by reacting azidoacetophenone with a mixture of phosphorus oxychloride and dimethyl formamide. The azidocinnamic aldehydes can be converted to azidochalkones by condensation with methyl aryl ketones which azidochalkones are useful as photo-sensitive materials.

---

This application is a continuation-in-part of U.S. application Ser. No. 741,296 filed July 1, 1968, now abandoned.

The present invention relates to azidocinnamic aldehydes which may be nucleo- or side-chain-substituted having the formula

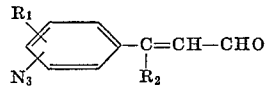

in which $R_1$ represents a hydrogen atom and $R_2$ represents a halogen atom, preferably chlorine, or in which $R_1$ represents a hydrogen atom or a halogen atom or a methoxy group, and $R_2$ represents a hydrogen atom.

The azidocinnamic aldehydes of the present invention are obtained by reacting azidobenzaldehydes of the formula

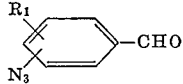

in which $R_1$ represents a hydrogen atom or a halogen atom, preferably chlorine, or a methoxy group, in known manner with a vinyl alkyl ether, in which case the alkyl group means an aliphatic hydrocarbon radical containing 1 to 6 carbon atoms.

For the preparation of the compounds of the present invention, azidobenzaldehyde is additively combined with a vinyl alkyl ether, in which case the alkyl group has the above-mentioned meaning, in the presence of an addition compound of boron trifluoride and ether at a temperature of from 20° to 35° C. in an inert anhydrous solvent, preferably benzene or ether, and the addition product is hydrolyzed by treatment with dilute acids at a temperature ranging from 80° to 100° C.

In this manner, the $\alpha,\beta$-unsaturated aldehyde having two additional carbon atoms is obtained.

The side-chain-substituted azidocinnamic aldehydes are obtained by stirring up azidoacetophenone in a solution of dimethyl formamide with a mixture of phosphorus oxychloride and dimethyl formamide in known manner, heating the reaction mixture at 60° to 80° C. for 3 to 10 minutes, pouring it into water and stirring it up with sodium acetate. The reaction product which is obtained in a solid form is separated and recrystallized in an appropriate solvent.

The azidocinnamic aldehydes of the invention are valuable intermediate products. They can be converted to azidochalkones by condensation with methyl aryl ketones as disclosed in co-pending U.S. application Ser. No. 742,141 filed July 3, 1968. The aforesaid azidochalkones are useful as photo-sensitive materials.

The following examples serve to illustrate the invention, but they are not intended to limit it thereto, the parts and percentages being by weight:

EXAMPLE 1

0.75 part of the addition compound of boron trifluoride and diethyl ether in 3 parts of anhydrous ether were added to a solution of 16 parts of 4-azidobenzaldehyde in 15 parts of anhydrous benzene. Under an atmosphere of nitrogen, a solution of 11 parts of vinyl-n-butyl ether in 45 parts of anhydrous benzene was added dropwise, while stirring, so that the temperature did not exceed 30° C. The mixture was left for 12 hours at room temperature. It was shaken with a saturated aqueous sodium bicarbonate solution and then with water. The organic phase was separated and the solvent distilled off in vacuo. 45 parts of glacial acetic acid, 45 parts of water and 2 parts of para-toluene sulfonic acid were added to the residue, and the whole was heated at 100 C. for 90 minutes, while stirring. After cooling, the mixture was poured on 300 parts of ice and extracted by agitation with ether. The ether phase was separated and shaken with a saturated, aqueous sodium bicrbonate solution and then with water. The organic phase was separated and dried over sodium sulfate. After filtering, the solvent was distilled off in vacuo, the residue was dried on a clay plate. 3.8 parts of 4-azidocinnamic aldehyde were obtained. Melting point: 63° to 65° C.

Analysis.—Calculated for $C_9H_7N_3O$ (percent): N, 24.3. Found (percent): N, 24.3.

The 2,4-dinitrophenyl hydrazone of the 4-azidocinnamic aldehyde can be prepared in the usual manner. Melting point: 197° to 200° C.

Analysis.—Calculated for $C_5H_{11}N_7O_4$ (percent): N, 27.7. Found (percent): N, 27.4

EXAMPLE 2

The reaction was carried out under the same conditions as those described in Example 1 except that 16 parts of 3-azidobenzaldehyde were used. 3.4 parts of 3-azidocinnamic aldehyde were obtained. Melting point: 57° to 59° C.

Analysis.—Calculated for $C_9H_7N_3O$ (percent): N, 24.3. Found (percent): N, 24.3.

EXAMPLE 3

0.1 part of the addition compound of boron trifluoride and diethyl ether in 1 part of anhydrous ether were added to a solution of 2.2 parts of 2-chloro-4-azidobenzaldehyde in 4 parts of anhydrous benzene. Under an atmosphere of nitrogen, a solution of 0.9 part of vinyl ethyl ether in 5 parts of anhydrous benzene was added dropwise, while stirring, so that the temperature did not exceed 30° C. The mixture was left for 12 hours at room temperature. It was shaken with a saturated aqueous sodium bicarbonate solution and then with water. The organic phase was separated and the solvent distilled off in vacuo. 5 parts of glacial acetic acid, 5 parts of water and 0.3 part of para-toluene sulfonic acid were added to the residue and the whole was heated at 100° C. for 90 minutes, while stirring. After cooling, the mixture was poured on 35 parts of ice and extracted by agitation with ether. The ether phase was separated, it was shaken with a saturated aqueous solution of sodium bicarbonate and then with water. The organic phase was separated and dried over sodium sulfate. After filtering, the solvent was distilled off in vacuo, the residue was dried on a clay dish and recrystallized in ethanol.

0.8 part of 2-chloro-4-azidocinnamic aldehyde was obtained. Melting point: 94° to 96° C.

*Analysis.*—Calculated for $C_9H_6ClN_3O$ (percent): N, 20.1; Cl, 17.1. Found (percent): N, 19.9; Cl, 16.8.

EXAMPLE 4

A solution of 16 parts of 4-azidoacetophenone in 15 parts of dimethyl formamide was stirred up with a mixture of 14 parts of phosphorus oxychloride and 20 parts of dimethyl formamide which had been prepared while cooling. This reaction mixture was heated for 5 minutes at 70° C., it was cooled to 5° C. and left for 12 hours at this temperature. Then the mixture was poured into 250 parts of water and stirred up with 40 parts of sodium acetate. The precipitate of β-chloro-4-azidocinnamic aldehyde which had formed was suction-filtered, washed with water and, after drying, recrystallized in ethanol.

Yield: 66%
Melting point: 102° C.

*Analysis.*—Calculated for $C_9H_6ClN_3O$ (percent): N, 20.1; Cl, 17.1. Found (percent): N, 19.4; Cl, 17.5.

EXAMPLE 5

The reaction was carried out under the same conditions as those described in Example 4 except that 16 parts of 3-azidoacetophenone were applied.

Yield: 50% β-chloro-azidocinnamic aldehyde
Melting point: 62° C.

*Analysis.*—Calculated for $C_9H_6ClN_3O$ (percent): N, 20.1. Found (percent): N, 20.6.

We claim:
1. Azidocinnamic aldehyde of the formula

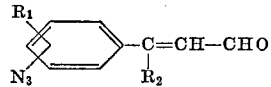

in which $R_1$ represents a hydrogen atom and $R_2$ represents a halogen atom or in which $R_1$ represents a hydrogen atom or a halogen atom or a methoxy group and $R_2$ represents a hydrogen atom.

References Cited

UNITED STATES PATENTS 2,543,312   2/1951   Copenhaver.

FOREIGN PATENTS 752,852   12/1953   Germany _____ 26—349

OTHER REFERENCES

Pastushak et al., Zh. Organ. Khim., vol. 1, pp. 323–5 (1965).

Weibenfels et al., Zeitschrifo fur Chemie, vol. 6, pp. 471–2 (1966).

JOHN M. FORD, Primary Examiner

U.S. Cl. X.R.

96—88